United States Patent
Chiku et al.

(10) Patent No.: US 6,462,857 B2
(45) Date of Patent: Oct. 8, 2002

(54) OPTICAL MODULATOR AND OPTICAL MODULATION METHOD

(75) Inventors: Shinichiro Chiku, Kyoto; Takashi Fujii, Otsu, both of (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/761,316

(22) Filed: Jan. 17, 2001

(65) Prior Publication Data

US 2001/0008456 A1 Jul. 19, 2001

(30) Foreign Application Priority Data

Jan. 17, 2000 (JP) ........................................ 2000-008000

(51) Int. Cl.$^7$ ................................................. G02F 1/09
(52) U.S. Cl. ...................... 359/280; 359/281; 359/284; 359/324; 359/312
(58) Field of Search ................................. 359/280, 281, 359/282, 283, 284, 285, 286, 324, 312, 256, 484, 195–197, 238, 278

(56) References Cited

U.S. PATENT DOCUMENTS

| | | | | | |
|---|---|---|---|---|---|
| 4,217,036 A | * | 8/1980 | Chang | ........................ | 350/358 |
| 4,671,621 A | * | 6/1987 | Dillon, Jr. et al. | .......... | 350/403 |
| 4,683,421 A | * | 7/1987 | Miller et al. | .................. | 324/96 |

OTHER PUBLICATIONS

Makoto Tsutsumi et al., "On the interactions between optical signals and microwaves in the yttrium iron garnet single crystal," The Institute of Electronics, Information and Communication Engineers, Jun. 1998, pp. (45–50).

John Fisher et al., "Optical guided–wave interactions with magnetostatic waves at microwave frequencies," Applied Physics Letter, Nov. 1992 (pp. 779–781).

C.S. Tsai et al., "Noncollinear coplanar magneto–optic interaction of guided optical wave and magnetostatic surface waves in yttrium iron garnet–gadolinium gallium garnet waveguides," Applied Physics Letter, Oct. 1985. (651–654).

* cited by examiner

Primary Examiner—Hung Xuan Dang
Assistant Examiner—Tuyen Tra
(74) Attorney, Agent, or Firm—Keating & Bennett, LLP

(57) ABSTRACT

An optical modulator includes a magnetic ferrite single crystal, an optical source, a photoreceptor system and an analyzer. The magnetic ferrite single crystal has a transducer mounted and arranged to receive a microwave. The microwave is modulated by a signal having a frequency lower than the microwave. Light emitted from the optical source is introduced to the magnetic garnet single crystal and modulated by the microwave applied to the transducer. The photoreceptor system receives the modulated light that is emitted from the magnetic ferrite single crystal. The analyzer is provided between the magnetic ferrite single crystal and the photoreceptor system, and the analyzer is arranged such that a rotation angle of the analyzer about an optical axis thereof is shifted by an angle in the range of about 40 degrees to about 50 degrees from an extinct position at which an amount of direct-current light transmitted through analyzer is minimized.

17 Claims, 4 Drawing Sheets

OPTICAL MODULATOR AND OPTICAL MODULATION METHOD

BACKGROUND OF THE INVENTION

1. Field of the Invention

The present invention relates to an optical modulator and an optical modulation method, and more particularly, the present invention relates to an optical modulator and an optical modulation method for obtaining an optical intensity as a result of modulation by an alternating-current signal of several hundreds or lower megahertz.

2. Description of the Related Art

Conventionally, optical modulators have been configured such that light passes through a magnetic ferrite single crystal, such as an yttrium iron garnet (YIG), a thin-line transducer, a microstrip line, or other suitable element, microwaves are applied thereto, and the optical intensity is modulated by the microwaves. (For example, refer to an article by Makoto Tsutsumi, Tetsuya Ueda, and Others in "Shingaku Giho", Vol. 98, No. 123 MW98-41, OPE98-33 (1988), pp. 45). A conventional optical modulator is shown in FIG. 1.

FIG. 1 is a view showing an example of a conventional optical modulator that relates to the present invention described hereinbelow. An optical modulator 10 shown in FIG. 1 includes a plate-like magnetic garnet single crystal 12 for use as a magnetic ferrite single crystal. A microstrip line 14 defining a transducer is provided in a central portion of one of the primary surfaces of the magnetic garnet single crystal 12.

An output terminal of a microwave-signal generator 16 is connected to one end of the microstrip line 14 via(a microwave amplifier 18. In addition, an output terminal of an optional-signal generator 19 is connected to the microwave-signal generator 16. The optional-signal generator 19 modulates a microwave that has been output from the output terminal of the microwave-signal generator 16, and it uses an alternating-current signal having a frequency that is lower than that of the microwave for the modulation. The other end of the microstrip line 14 is connected to a terminal resistor 20.

In addition, a permanent magnet (not shown) is provided near the magnetic garnet single crystal 12. The permanent magnet is used to apply a dielectric-current magnetic field in a direction that is parallel to the magnetic garnet single crystal 12 and perpendicular to the microstrip line 14.

Outside of one peripheral surface of the magnetic garnet single crystal 12, a light source such as a laser-beam source 22, a polarizer 24, and a first lens 26 are arranged to be close to the magnetic garnet single crystal 12 in that order. The laser-beam source 22 generates laser beams. The polarizer 24 linearly polarizes laser beams, which have been generated by the laser-beam source 22, in a predetermined direction. The first lens 26 concentrates the laser beams, which have been generated by the laser-beam source 22, into the magnetic garnet single crystal 12. In this way, the laser-beam source 22 is arranged such that laser beam emitted from the laserbeam source 22 is introduced to the magnetic garnet single crystal 12 and modulated by the microwave applied to the microstrip line 14.

In addition, in the outside of another peripheral surface of the magnetic garnet single crystal 12, a second lens 28, an analyzer 30, a third lens 32, and a photodiode 34 are arranged to be spaced apart from the magnetic garnet single crystal 12 in that order and arranged to receive the light beam emitted from the magnetic garnet single crystal 12. The second lens 28 rectifies laser beams transmitted through the magnetic garnet single crystal 12 to parallel beams. The analyzer 30 allows the linearly polarized laser beams to be transmitted in a predetermined direction and the analyzer is arranged to have the crossed-Nicols relationship with the polarizer 24. The third lens 32 converges the laser beams transmitted through the analyzer 30. The photodiode 34 detects laser-beam signals.

Also, an output terminal of the photodiode 34 is connected to an input terminal of a photoelectric-current amplifier 36.

In the optical modulator 10 shown in FIG. 1, optical systems (configurations of the magnetic garnet single crystal 12 and the components on two sides thereof) are substantially the same as a measurement optical system for transmission-type photomagnetic effects, such as a Faraday effect. Specifically, a microwave is applied to the magnetic garnet single crystal 12 via the microstrip line 14 defining the transducer to couple the light and the microwave together in the magnetic garnet single crystal 12, and a polarized state of the light is modulated according to the microwave. The modulated state is then converted by a Faraday optical system into the variation in the intensity for the implementing detection.

FIG. 2 is a view showing a waveform of an optical-signal that is produced without a microwave being applied in the optical modulator 10 shown in FIG. 1. FIG. 3 is a view showing a waveform of an optical-signal that is produced with a microwave being applied in the optical modulator 10 shown in FIG. 1. When the microwave is not applied, as shown in FIG. 2, the light transmitted through the magnetic garnet single crystal 12 remains in the state of direct current, and the optical output is constant. However, when the microwave is applied, as shown in FIG. 3, a modulated alternating-current component overlaps with a direct-current component.

The microwave applied to the magnetic garnet single crystal 12 is preliminarily modulated according to the alternating-current signal, which has been generated by the optional-signal generator 19 and which has a frequency lower than that of the microwave. Therefore, the intensity of the light led to be incident on the photodiode 34 is also modulated further by the microwave modulated according to the low-frequency signal. When the frequency band of each of the photoreceptor systems (such as the photodiode 34 and the photoelectric-current amplifier 36) includes the frequency of the signal that modulates the microwave and is lower than the frequency of the microwave, the individual photoreceptor system functions as a low-pass filter in which only the signal for modulating the microwave has sensitivity to the optical signal. Accordingly, the alternating-current component of the optical signal that is output from the photoelectric-current amplifier 36 matches the low-frequency signal that modulates the microwave. As a result, the optical-signal output is modulated according to the alternating-current signal having the frequency lower than the microwave.

The reason that the microwave is first modulated using the low-frequency alternating-current signal and is then applied to the magnetic garnet single crystal 12 is that any frequency band other than the microwave frequency band cannot be propagated through the magnetic garnet single crystal 12.

In the optical modulator 10, either when an external magnetic field is not applied to the magnetic garnet single crystal 12 or when an applied external magnetic field applied thereto is extremely weak, the microwave is just propagated therethrough, and optical modulation is implemented by the microwave. When a sufficiently intensive external magnetic field is applied to the magnetic garnet single crystal 12, a static magnetowave is excited, and optical modulation is implemented by the static magnetowave.

However, conventionally, while attempts have been made to generate an optical modulation phenomenon according to either the microwave or the static magnetowave, no attempt has been successfully made to achieve greatly increased modulation.

For this reason, with the conventional optical modulator having the configuration shown in FIG. 1, problems are caused such that the optical-modulation amplitude cannot be easily increased to a desired very large value, and the signal to noise ratio is very small.

SUMMARY OF THE INVENTION

In order to overcome the problems described above, preferred embodiments of the present invention provide an optical modulator optical and a modulation method in which the optical modulation amplitude is greatly increased and in addition the signal to noise ratio (S/N) is greatly increased.

According to a preferred embodiment of the present invention, an optical modulator includes a magnetic ferrite single crystal, an optical source, a photoreceptor system and an analyzer. The magnetic ferrite single crystal has a transducer mounted thereon and arranged to receive a microwave. The microwave is modulated by a signal having a frequency lower than the microwave. The optical source is arranged such that light emitted from the optical source is introduced to the magnetic garnet single crystal and modulated.by the microwave applied to the transducer. The photoreceptor system is arranged so as to receive the modulated light that is emitted from the magnetic ferrite single crystal. The analyzer is provided between the magnetic ferrite single crystal and the photoreceptor system, and the analyzer is arranged such that a rotation angle of the analyzer about an optical axis thereof is shifted by an angle in the range of about 40 degrees to about 50 degrees from an extinct position at which an amount of direct-current light transmitted through the analyzer is minimized.

In the optical modulator of one of the preferred embodiments of the present invention, a frequency band of a photoreceptor system includes, for example, the frequency of a signal that modulates the microwave, and concurrently, is lower than the frequency of the microwave.

In the optical modulator of another preferred embodiment the present invention, the magnetic ferrite single crystal is, for example, an iron yttrium garnet.

An optical modulation method according to another preferred embodiment of the present invention applies a microwave to a transducer formed in a magnetic ferrite single crystal and thereby modulates light being transmitted through the magnetic ferrite single crystal. The method is performed such that the microwave applied is modulated by an alternating-current signal having a frequency that is lower than that of the microwave, and the rotation angle of an analyzer in the optical-axis rotation direction is set by further rotating the analyzer by about 40 degrees to about 50 degrees from a rotation angle (extinct position) at which the amount of direct-current light transmitted through the analyzer is minimized.

In the optical modulation method of a preferred embodiment of the present invention, a frequency band of a photoreceptor system includes, for example, the frequency of a signal that modulates the microwave, and concurrently, is lower than the frequency of the microwave.

In the optical modulation method of another preferred embodiment of the present invention, the magnetic ferrite single crystal is, for example, an iron yttrium garnet.

In the optical modulator and the optical modulation method according to various preferred embodiments of the present invention, the rotation angle in the optical-axis rotation direction of the analyzer is set preferably by further rotating the analyzer by about 40 to about 50 degrees from a rotation angle (extinct position) at which the amount of direct-current light transmitted through the analyzer is minimized. Thereby, substantially the largest signal to noise ratio (S/N) can be obtained.

According to a conventional technique, the opticalmodulation amplitude of an output from the first photoelectric-current amplifier 36 is 1 $\mu$V. However, preferred embodiments of the present invention achieve a significant advantage of increasing the optical-modulation amplitude to about 10 mV.

Other features, elements, characteristics and advantages of the present invention will become apparent from the detailed description of preferred embodiments thereof with reference to the attached drawings.

For the purpose of illustrating the invention, there is shown in the drawings several forms that are presently preferred, it being understood, however, that the invention is not limited to the precise arrangements and instrumentalities shown.

DETAILED DESCRIPTION OF PREFERRED EMBODIMENTS

Hereinafter, preferred embodiments of the present invention will be explained in detail with reference to the drawings.

Figure 1:
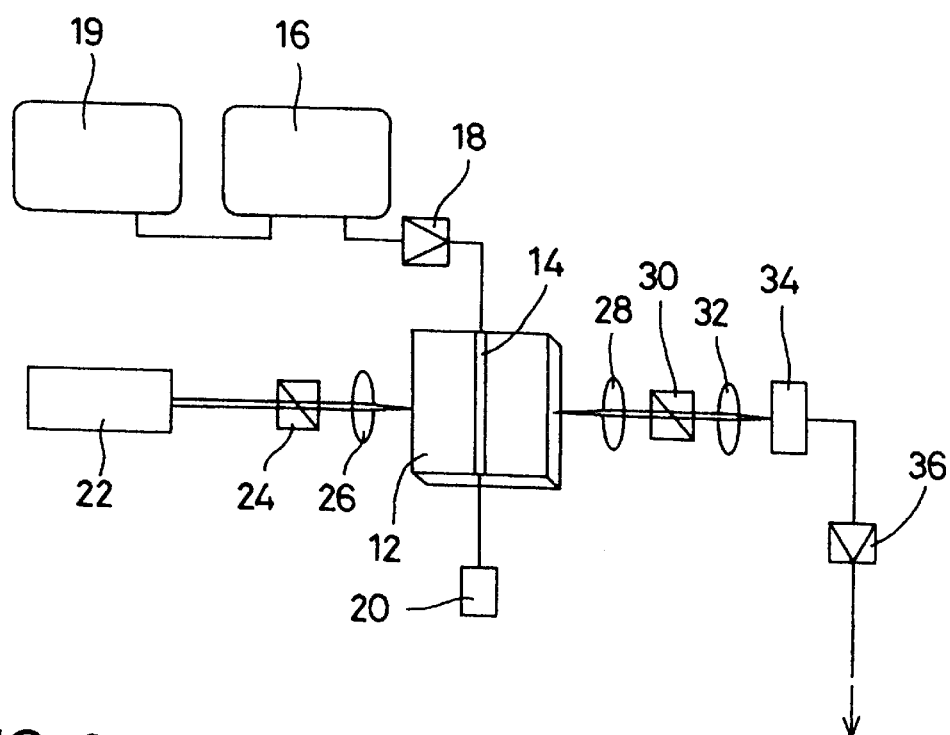
FIG. 1 is a view showing an example of a conventional optical modulator that relates to the present invention.
Figure 2:
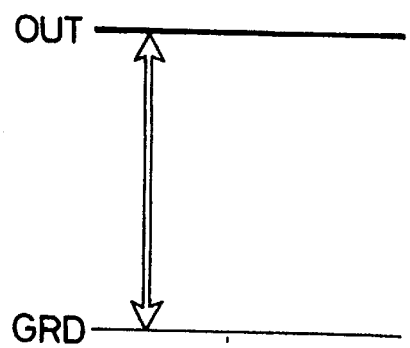
FIG. 2 is a view showing a waveform of an optical signal that is output without a microwave being applied in the optical modulator shown in FIG. 1.
Figure 4:
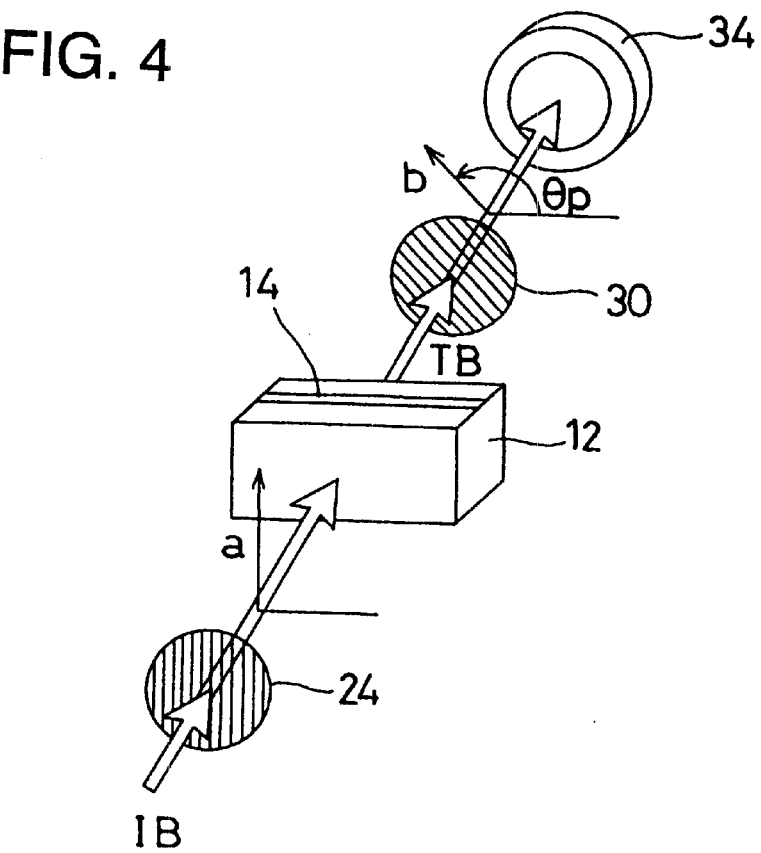
FIG. 4 is an extracted view of only an optical-system portion of the optical modulator shown in FIG. 1.

FIG. 4 is an extracted view of only the optical-system portion of the optical modulator 10 shown in FIG. 1. An oscillation direction a (the oscillation direction of an electric field) of incident light IB that is caused to be incident on the magnetic garnet single-crystal 12 is determined according to the rotation angle in the optical-axis rotation direction of the polarizer 24. However, with a laser as a light source that emanates linearly polarized optical beams, even in a configuration not using the polarizer 24, the oscillation direction a of the incident light IB can be determined according to the rotation angle in the optical-axis rotation direction of the laser. The oscillation direction a of the incident light IB may be appropriately determined, however, the angle is preferably arranged to cause the ellipticity of the light emanated from the magnetic garnet single-crystal 12 to be minimized as much as possible, and the optical-modulation amplitude thereof is increased.

Figure 3:
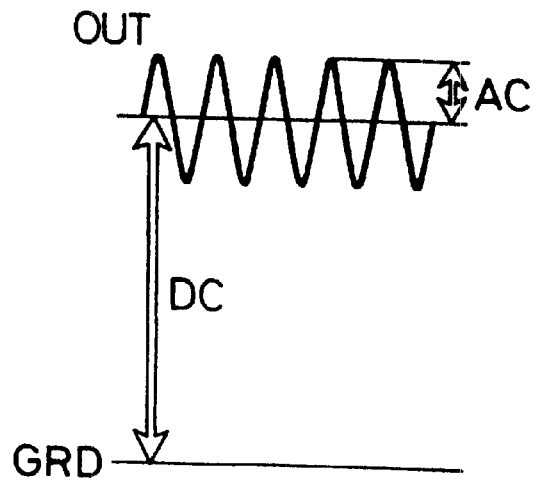
FIG. 3 is a view showing a waveform of an optical signal that is output with a microwave being applied in the optical modulator shown in FIG. 1.

Suppose the oscillation direction a of the incident light IB is fixed in a certain direction. In this case, when the analyzer 30 is rotated in the optical-axis rotation direction, as shown in FIG. 3, the variations are individually caused in the magnitude of a direct-current component DC and in the optical-modulation amplitude (the magnitude of an alternating-current component AC) according to the low-frequency signal that modulates the microwave.

As a result of careful study and research, the inventors discovered that the variations of the direct-current component DC and the alternating-current component AC are caused independently of each other, but are caused in a specific relationship.

When linearly polarized light is caused to be incident on a magnetic substance, an oscillatory surface of an emanated light rotates according to photomagnetic effects. In addition, the emanated light becomes elliptically polarized light. For example, in the Faraday effect, the resulting elliptically polarized light is caused according to magnetic circular dichroism (characteristics in which optical absorption coefficients of a magnetic substance differ with respect to clockwise circular polarization and counterclockwise circular polarization). For this reason, when the analyzer 30 shown in FIG. 4 is driven to rotate in the optical-axis rotation direction, according to the photomagnetic effect, the oscillatory surface of the emanated light rotates in the direction along which the magnitude of the direct-current component DC shown in FIG. 3 is maximized. In addition, in the direction along which the analyzer 30 rotates approximately 90 degrees from the aforementioned state, the magnitude of the direct-current component DC is minimized. That is, it is an extinct position. The magnitude is not reduced to be zero when the emanated light becomes the elliptically polarized light.

According to the study and research conducted by the inventors, when the analyzer 30 is rotated by a certain degree from the extinct position, the magnitude of the alternating-current component AC was discovered to be maximized. Typically, the angle is about 45 degrees, and generally, the angle ranges from about 40 degrees to about 50 degrees. Therefore, by setting the analyzer 30 in the optical-axis direction by further rotating it, typically by the angle of about 45 degrees, and generally by the angle of about 40 degrees to about 50 degrees, a greatly increased and very large amplitude modulated by the microwave is achieved and a very high signal to noise ratio (S/N) is also obtained.

In the above-described preferred embodiments, description has been made regarding the optical modulator and the optical modulation method that use only light transmitted through the analyzer 30 of the optical modulator 10 shown in FIG. 1. In addition to the above-described methods, an optical modulator and an optical modulation method that concurrently use both light transmitted through the analyzer and light reflected therefrom may be used as a measurement apparatus and a measurement method for Faraday effects.

Figure 5:
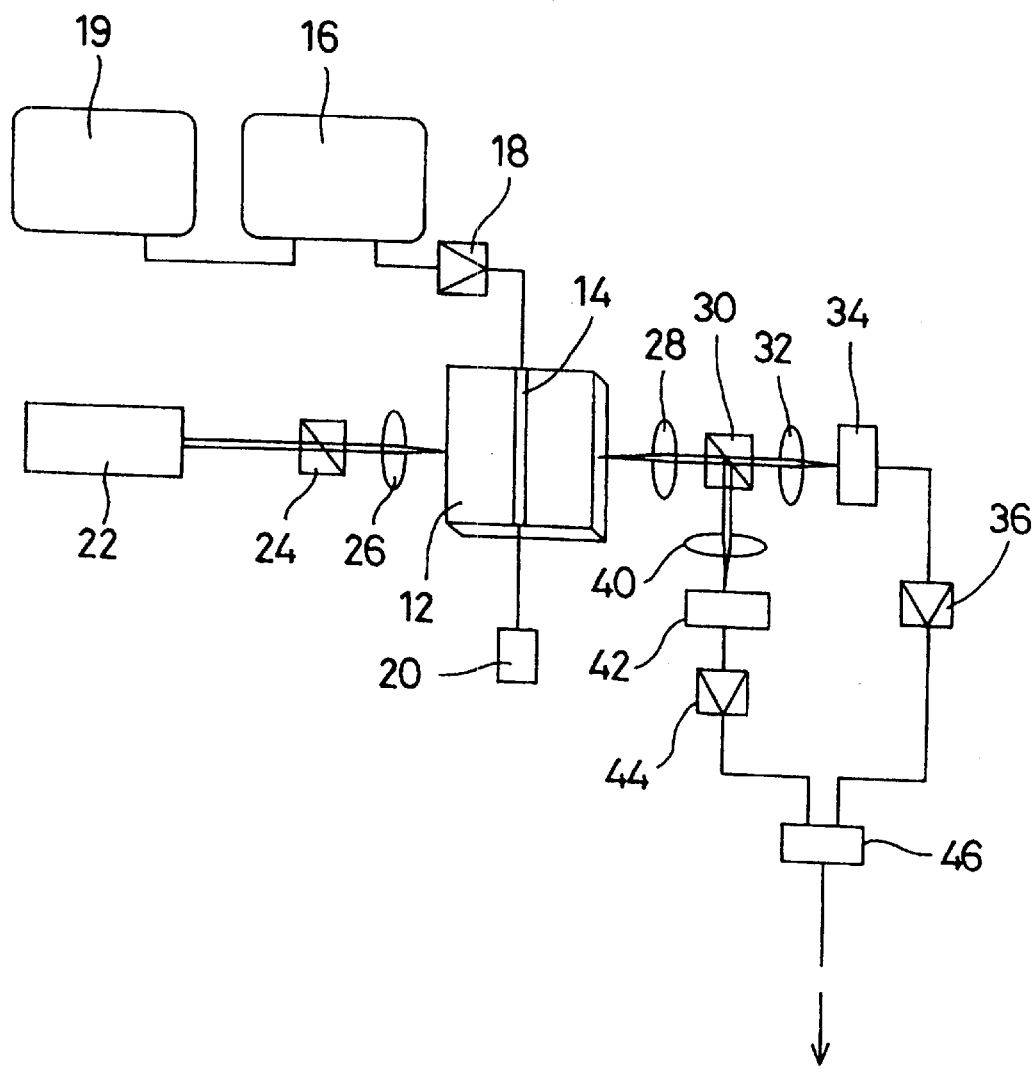
FIG. 5 is a view showing an example optical modulator that uses light transmitted through an analyzer, but also light reflected therefrom.

FIG. 5 is a view showing an example of an optical modulator of the aforementioned type. An optical modulator 11 shown in FIG. 5 is arranged to use also light reflected from the analyzer 30 in the optical modulator 10. Therefore, in comparison to the optical modulator 10 shown in FIG. 1, in the optical modulator 11 shown in FIG. 5, a fourth lens 40 and a second photodiode 42 are arranged so as be spaced apart from an analyzer 30 in that order in the direction which intersects with the direction along which a second lens 28, an analyzer 30, and a third lens 32 are aligned and which extends through the analyzer 30. The fourth lens 40 converges light reflected from the analyzer 30. The second photodiode 42 detects the light reflected from the analyzer 30. An output terminal of a second photodiode 42 is connected to an input terminal of a second photoelectric-current amplifier 44. Individual output terminals of a first photoelectric-current amplifier 36 and the second photoelectric-current amplifier 44 are connected to an input terminal of a signal-operating unit 46. An output of the first photoelectric-current amplifier 36 is represented by A, and an output of the second photoelectric-current amplifier 44 is represented by B. In this case, (A−B)/(A+B) is output from an output terminal of the signal-operating unit 46.

Generally, when an alternating-current component of the output A of the first photoelectric-current amplifier 36 is compared to an alternating-current component of the output B of the second photoelectric-current amplifier 44, their polarities are reversed. Therefore, the analyzer 30 is rotated typically by about 45 degrees or generally by about 40 to about 50 degrees from an extinct position of light transmitted through the analyzer 30 in the optical modulator 11 shown in FIG. 5. In this case, the individual magnitudes of the alternating-current component of the output A of the first photoelectric-current amplifier 36 and the alternating-current component of the output B of the second photoelectric-current amplifier 44 are maximized. In addition, since (A−B)/(A+B) is output from the output terminal of the signal-operating unit 46, noise of the same polarity, which is included in either A or B, is eliminated. Therefore, the optical modulator 11 shown in FIG. 5 can achieve a signal to noise ratio (S/N) that is even higher than in the case of the optical modulator 10 shown in FIG. 1.

In one example of preferred embodiments of the present invention, for the magnetic ferrite single crystal, pure-YIG bulk single crystal grown in a floating zone method was used. The crystal was cut to have approximate dimensions of 5 mm×5 mm×0.8 mm, and each surface thereof was abraded so as to define a mirror surface. A semiconductor laser having a wavelength of about 1.3 $\mu$m was used as a light source, and the light was emanated from one of the surfaces each having the approximate dimensions of 5 mm×0.8 mm and was caused to be incident on and to pass through the crystal. The direction along which the incident light oscillates was fixed so as to match the direction of a plate surface that is normal relative to the plate-like crystal. On the crystal surface having dimensions of approximately 5 mm×5 mm, a microstrip line defining a transducer was arranged to cause the characteristic impedance to be 50-$\Omega$. A 1.72-GHz microwave modulated according to an AM method with a sine wave having a frequency of about 5 kHz was applied to the microstrip line. The direction of the microstrip line was arranged to be substantially perpendicular to the light-forwarding direction. No external magnetic field was applied thereto.

Figure 6:
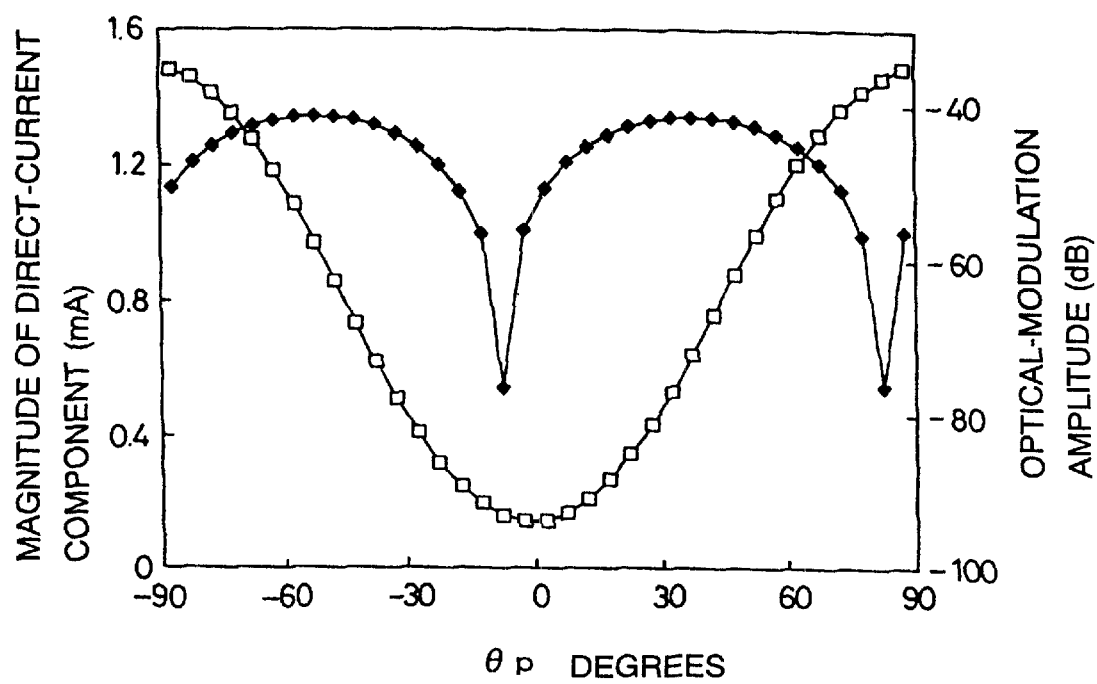
FIG. 6 is a graph showing the magnitude of a direct-current component and the magnitude (optical-modulation amplitude) of an optical output signal detected when the analyzer is driven to rotate.

The magnitude of a direct-current component and the magnitude (optical-modulation amplitude) of an optical-signal output detected with an analyzer being rotated are shown in a graph in FIG. 6. In the figure, $\theta p$ represents the rotation angle from the extinct position of the analyzer in the optical-axis rotation direction. Therefore, the extinct position is determined when θp=0. The angle θp at which the direct-current component is maximized is approximately 90 degrees, the angle θp at which the optical-modulation amplitude is maximized is about 40 degrees, and the differential angle from the extinct position in this case is about 40 degrees.

As an alternative to the bulk single crystal used for the magnetic ferrite single crystal, a thin-film single crystal grown according to, for example, a liquid epitaxial method, may be used.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An optical modulator comprising:

a single crystal having a transducer mounted thereon and arranged to receive a microwave, the microwave being modulated by a signal having a frequency lower than the microwave;

an optical source arranged such that light emitted from the optical source is introduced to the single crystal and modulated by the microwave applied to the transducer;

a photoreceptor system arranged to receive the modulated light which is emitted from the single crystal;

an analyzer provided between the single crystal and the photoreceptor system, the analyzer being arranged such that a rotation angle of the analyzer about an optical axis thereof is shifted by an angle in the range of about 40 degrees to about 50 degrees from an extinct position at which an amount of direct-current light transmitted through the analyzer is minimized.

2. An optical modulator according to claim 1, wherein the single crystal is a magnetic ferrite single crystal.

3. An optical modulator according to claim 1, wherein the single crystal is a magnetic garnet single crystal.

4. An optical modulator according to claim 1, wherein a frequency band of the photoreceptor system includes the frequency of the signal that modulates the microwave, and is lower than the frequency of the microwave.

5. An optical modulator according to claim 1, wherein the single crystal is an iron yttrium garnet.

6. An optical modulator according to claim 1, wherein the analyzer is arranged such that the rotation angle of the analyzer about the optical axis thereof is shifted by an angle of about 45 degrees from the extinct position.

7. An optical modulator according to claim 1, wherein the analyzer is arranged to receive and analyze only light that is transmitted through the analyzer.

8. An optical modulator according to claim 1, wherein the analyzer is arranged to receive and analyze light that is transmitted through the analyzer and light that is reflected from the analyzer.

9. An optical modulation method comprising the steps of:

providing a single crystal having a transducer mounted thereon;

transmitting light through the single crystal;

applying a microwave to the transducer on the single crystal to modulate light being transmitted through the single crystal;

modulating the microwave applied to the transducer by an alternating-current signal having a frequency that is lower than that of the microwave;

passing the modulated light through an analyzer; and arranging a rotation angle of the analyzer in the optical-axis rotation direction by rotating the analyzer by about 40 degrees to about 50 degrees from a rotation angle at which the amount of direct-current light transmitted through the analyzer is minimized.

10. An optical modulation method according to claim 9, further comprising the step of providing a photoreceptor system to receive the modulated light that is emitted from the single crystal.

11. An optical modulation method according to claim 9, wherein the single crystal is a magnetic ferrite single crystal.

12. An optical modulation method according to claim 9, wherein the single crystal is a magnetic garnet single crystal.

13. An optical modulation method according to claim 9, wherein a frequency band of the photoreceptor system includes the frequency of the signal that modulates the microwave and is lower than the frequency of the microwave.

14. An optical modulation method according to claim 9, wherein the single crystal is an iron yttrium garnet.

15. An optical modulation method according to claim 9, wherein the step of rotating the analyzer is performed such that the analyzer is shifted by an angle of about 45 degrees from the extinct position.

16. An optical modulation method according to claim 9, wherein the analyzer is arranged to receive and analyze only light that is transmitted through the analyzer.

17. An optical modulation method according to claim 9, wherein the analyzer is arranged to receive and analyze light that is transmitted through the analyzer and light that is reflected from the analyzer.

* * * * *